(12) United States Patent
Chellan

(10) Patent No.: US 11,845,317 B2
(45) Date of Patent: Dec. 19, 2023

(54) BRACKET FOR A POWER MODULE OF A TRANSPORT REFRIGERATION UNIT

(71) Applicant: THERMO KING LLC, Minneapolis, MN (US)

(72) Inventor: Senthil Kumar Chellan, Galway (IE)

(73) Assignee: THERMO KING LLC, Minneapolis, MN (US)

( * ) Notice: Subject to any disclaimer, the term of this patent is extended or adjusted under 35 U.S.C. 154(b) by 750 days.

(21) Appl. No.: 17/005,760

(22) Filed: Aug. 28, 2020

(65) Prior Publication Data

US 2021/0061068 A1 Mar. 4, 2021

(30) Foreign Application Priority Data

Sep. 4, 2019 (EP) .................................... 19195466

(51) Int. Cl.
*B60H 1/32* (2006.01)
*B60R 16/03* (2006.01)
*B60P 3/20* (2006.01)

(52) U.S. Cl.
CPC .............. *B60H 1/3229* (2013.01); *B60P 3/20* (2013.01); *B60R 16/0307* (2013.01)

(58) Field of Classification Search
CPC .......................... B60H 1/3229; B60R 16/0307
USPC .............................. 123/179.19, 195 A, 195 C
See application file for complete search history.

(56) References Cited

U.S. PATENT DOCUMENTS 5,222,373 A * 6/1993 Waldschmidt ........ F25B 43/006
62/509
6,244,239 B1 * 6/2001 Sisco ....................... F02B 67/06
123/195 A
6,371,072 B1 * 4/2002 Huber ..................... F02B 63/04
123/198 C
7,717,080 B1 5/2010 Grozich
8,028,671 B1 * 10/2011 Grozich .................. F02B 67/06
248/220.21
8,408,188 B1 * 4/2013 Hormilla ................. F02B 33/32
474/166
2006/0091751 A1 * 5/2006 Gaul ........................ H02K 5/26
310/411
2008/0017163 A1 * 1/2008 Petutsching .......... F02F 7/0073
123/195 A (Continued)

FOREIGN PATENT DOCUMENTS

CN          103963599       8/2014
KR          20040105394    12/2004

(Continued)

OTHER PUBLICATIONS

Extended European Search Report, issued in the corresponding EP patent application No. 19195466 8, dated Mar. 17, 2020, 7 pages.

*Primary Examiner* — Erick R Solis
(74) *Attorney, Agent, or Firm* — Hamre, Schumann, Mueller & Larson, P.C.

(57) ABSTRACT

A bracket for a power module of a transport refrigeration unit is provided. The bracket includes a body portion including: an opening for receiving a shaft of an electric machine of the power module; a plurality of first mounting holes extending through the body portion and spaced around the opening for connecting the bracket to the electric machine; and a plurality of second mounting holes for connecting the bracket to an engine of the power module.

16 Claims, 8 Drawing Sheets

(56) References Cited

U.S. PATENT DOCUMENTS

| | | | | |
|---|---|---|---|---|
| 2009/0159038 A1* | 6/2009 | Koyama | ............... | F02F 7/0068 123/195 A |
| 2015/0343941 A1* | 12/2015 | Lawrence | ................. | B60P 3/20 454/91 |
| 2018/0319247 A1* | 11/2018 | Gotmalm | ........... | B60H 1/00378 |
| 2019/0308672 A1* | 10/2019 | Schounard | ........... | B60H 1/3229 |

FOREIGN PATENT DOCUMENTS

| | | | | |
|---|---|---|---|---|
| KR | 101838151 B1 * | 3/2018 | ........... | B60H 1/3232 |
| WO | 2019161361 | 8/2019 | | |

\* cited by examiner

BRACKET FOR A POWER MODULE OF A TRANSPORT REFRIGERATION UNIT

BACKGROUND

A transport climate control system can include, for example, a transport refrigeration system (TRS) and/or a heating, ventilation and air conditioning (HVAC) system. A TRS is generally used to control an environmental condition (e.g., temperature, humidity, air quality, and the like) within a cargo space of a transport unit (TU; e.g. a truck, a container (such as a container on a flat car, an intermodal container, etc.), a box car, a semi-tractor, a bus, or other similar transport unit). The TRS can maintain environmental condition(s) of the cargo space to maintain cargo (e.g., produce, frozen foods, pharmaceuticals, etc.) The transport unit may also include a HVAC system to control a climate within a passenger space of the vehicle.

A TRS typically comprises a Transport Refrigeration Unit (TRU) which is disposed on a wall of the TU. The TRU is usually required to fit in a specified space envelope and this can make it difficult to package the required components within the housing of the TRU and obtain the proper layout of those components. Further, the space limitations can also make the assembly and maintenance of the components of the TRU more difficult.

SUMMARY

According to an aspect of the disclosure, there is provided a bracket for a power module of a transport refrigeration unit, the bracket comprising: a body portion comprising: an opening for receiving a shaft of an electric machine of the power module; a plurality of first mounting holes extending through the body portion and spaced around the opening for connecting the bracket to the electric machine; and a plurality of second mounting holes for connecting the bracket to an engine of the power module.

The bracket may further comprise a mounting arm which extends from the body portion and configured to connect the power module to a support frame.

The mounting arm may comprise a mounting hole which is configured to be received over an engine mount provided on the frame. The mounting arm may thereby precisely locate the bracket and thus the power module relative to the frame.

The body portion may further comprise a tensioner slot for receiving a tensioner pulley, the tensioner pulley being mounted on a carriage which is translatably mounted along the tensioner slot so as to tension a belt provided between the engine and the electric machine.

The body portion may further comprise a leadscrew barrel which intersects the tensioner slot, wherein the leadscrew barrel receives a leadscrew which is configured to translate the carriage along the tensioner slot.

The tensioner slot may be provided at a position which is between the plurality of first mounting holes and the plurality of second mounting holes and may extend laterally in a widthwise direction across the body portion.

The body portion may comprise a pair of shoulders and the plurality of second mounting holes may be provided on the shoulders.

At least a portion of an end surface of the body portion (e.g. in the region of the shoulders) may be curved to correspond to a flywheel housing of the engine.

A slot may be formed in an end surface of the body portion for receiving a flange of a flywheel housing of the engine.

According to another aspect, there is provided a power module for a transport refrigeration unit comprising: a bracket as described above; an engine; and an electric machine connected to the engine via the bracket; wherein the electric machine is connected to the bracket via the plurality of first mounting holes and the engine is connected to the bracket via the plurality of second mounting holes.

The electric machine may be bolted to the plurality of first mounting holes of the bracket and the engine may be bolted to the plurality of second mounting holes of the bracket.

The electric machine may be supported from the engine by the bracket in a cantilevered fashion.

The electric machine may be supported from the engine by the bracket so that a shaft of the engine and a shaft of the electric machine are held parallel to one another. The bracket may be of sufficient thickness in order to provide the necessary stiffness and strength to hold the electric machine with little or no deflection to maintain drive alignment. The bracket may have a thickness of between 30-50 mm, or more preferably between 40-45 mm, or more preferably 43 mm. The bracket is also able to withstand vibrations generated by the road and engine during use.

A shaft of the engine and a shaft of the electric machine may be connected by a belt.

The electric machine may be connected to the bracket via an end bell of the electric machine and/or the engine may be connected to the bracket via a flywheel housing of the engine.

The flywheel housing of the engine may be received between a pair of shoulders of the body portion of the bracket.

The flywheel housing of the engine may be received within a slot formed in an end surface of the body portion of the bracket.

According to another aspect, there is provided a transport refrigeration unit comprising a power module as described above.

The power module may be mounted to a frame of the transport refrigeration unit via the mounting arm of the bracket.

BRIEF DESCRIPTION OF THE DRAWINGS

Embodiments will now be described by way of example only, with reference to the Figures, in which.

DETAILED DESCRIPTION

Figure 1:
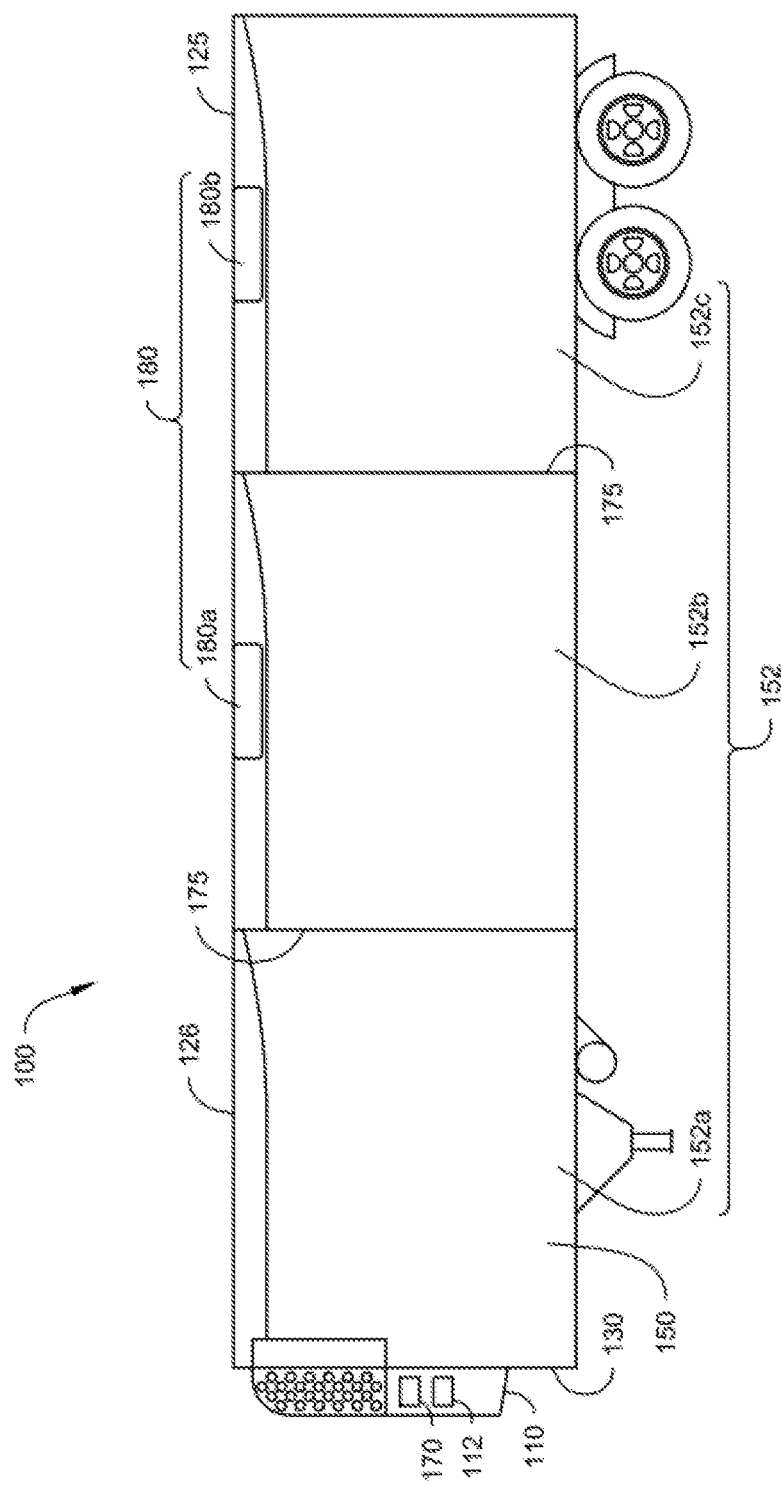
FIG. 1 illustrates a schematic cross-sectional side view of a refrigerated transport unit with a multi-temperature transport refrigeration system.

FIG. 1 illustrates an example of a Transport Refrigeration System (TRS) 100 for a Transport Unit (TU) 125 that can be towed, for example, by a tractor (not shown). The TRS 100 includes a Transport Refrigeration Unit (TRU) 110 that provides environmental control (e.g. temperature, humidity, air quality, etc.) within an internal space 150 of the TU 125 using a refrigeration system. The TRS 100 also includes a controller 170 and one or more sensors (e.g., Hall Effect sensors, current transducers, etc.) that are configured to measure one or more parameters (e.g., ambient temperature, compressor suction pressure, compressor discharge pressure, supply air temperature, return air temperature, humidity, etc.) of the TRS 100 and communicate parameter data to the controller 170. The TRS 100 is powered by a power module 112.

The power module 112 can provide power to, for example, the controller 170, a compressor (not shown), a plurality of DC (Direct Current) components (not shown), a power management unit, etc.

The TRU 110 is disposed on a front wall 130 of the TU 125. In other examples, it will be appreciated that the TRU 110 can be disposed, for example, on a rooftop 126 or another wall of the TU 125. As shown in FIG. 1, the power module 112 is disposed in the TRU 110. In other examples, the power module 112 can be separate from the TRU 110.

The internal space 150 may form a single zone at a substantially uniform temperature. Alternatively, the internal space 150 may be divided into a plurality of zones 152 (specifically, zones 152*a*, 152*b*, 152*c*) by partition walls 175. The walls 175 may be movable (e.g. hinged at the top) so as to allow the internal space 150 to be reconfigured. The zones 152 may be kept at different temperatures and thus used to transport different cargo. One or more remote evaporators 180 are provided to cool those zones 152 which are spaced from the TRU 110. Specifically, two remote evaporators 180*a*, 180*b* are provided in zones 152*b*, 152*c*.

Figure 2:
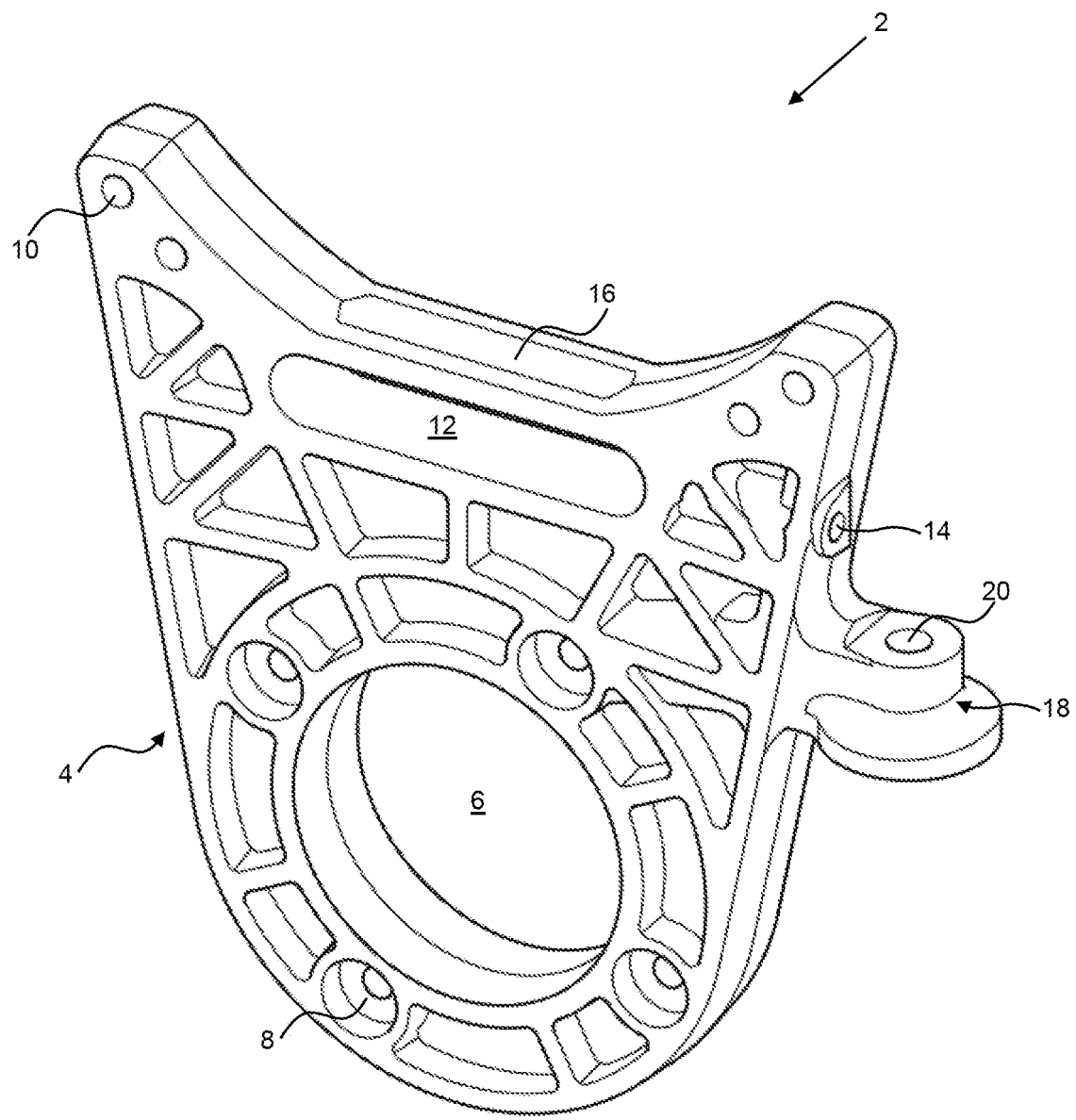
FIG. 2 is a perspective view of a bracket according to an embodiment of the disclosure.
Figure 3:
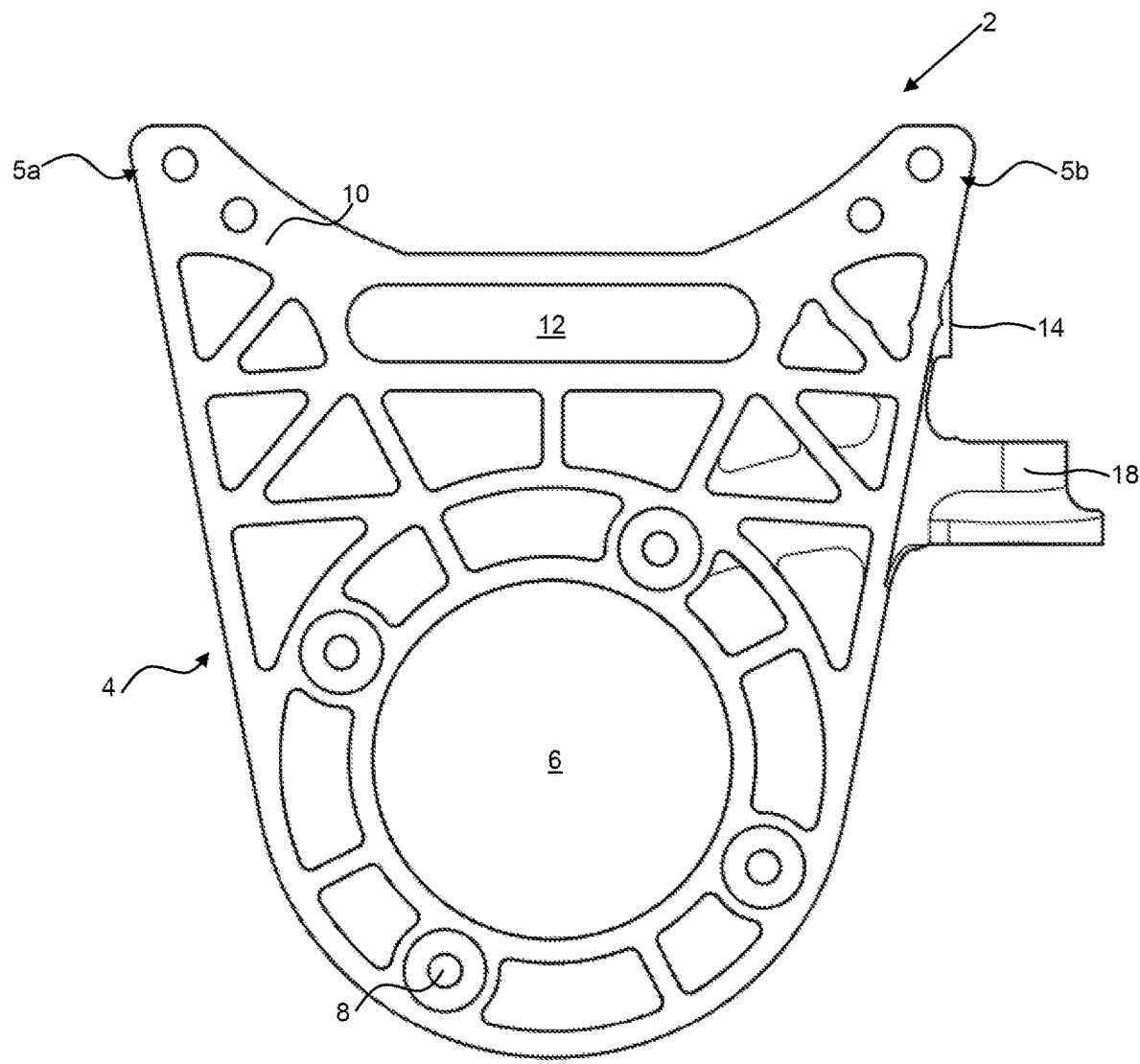
FIG. 3 is a front view of the bracket.

FIGS. 2 and 3 show a bracket 2 according to an embodiment of the disclosure which may be used in the power module 112 of the TRU 110, for example.

The bracket 2 comprises a main body portion 4. An opening 6 is formed towards a first, lower end of the body portion 4. The opening 6 is circular and extends through the thickness of the body portion 4 from a front surface to a rear surface. The opening 6 is sized to receive a shaft of an electric machine, as will be described further below. A plurality of first mounting holes 8 (four are shown) are spaced around the circumference of the opening 6 for attaching the bracket 2 to the electric machine. Like the opening 6, the first mounting holes 8 extend through the thickness of the body portion 4 from a front surface to a rear surface. The first mounting holes 8 are provided with a counterbore.

A plurality of second mounting holes 10 (four are shown) are provided at a second, upper end of the body portion 4. Specifically, the body portion 4 defines a pair of shoulder portions 5*a*, 5*b* and the second mounting holes 10 are located on the shoulder portions 5*a*, 5*b*. The second mounting holes 10 are arranged in two pairs, with each pair being located on one of the shoulder portions 5*a*, 5*b* towards each lateral side of the body portion 4. Like the opening 6 and the first mounting holes 8, the second mounting holes 10 extend through the thickness of the body portion 4 from a front surface to a rear surface.

The main body portion 4 is further provided with an elongate tensioner slot 12. The tensioner slot 12 extends through the thickness of the body portion 4 from a front surface to a rear surface. The length of the tensioner slot 12 extends widthwise from a position towards one lateral side of the body portion 4 to a position towards an opposing lateral side of the body portion 4.

The tensioner slot 12 is provided between the opening 6 and the second mounting holes 10 in a lengthwise direction.

A leadscrew barrel 14 extends from one of the sides of the body portion 4 and intersects the tensioner slot 12. The leadscrew barrel 14 runs parallel to the length of the tensioner slot 12. The leadscrew barrel 14 has a longitudinal axis which is perpendicular to longitudinal axes of the first and second mounting holes 8, 10 and thus the longitudinal axis of the leadscrew barrel 14 lies in the plane of the body portion 4.

As shown in FIG. 2, a flange-receiving slot 16 is formed in an end (top) surface of the body portion 4 between the shoulder portions 5*a*, 5*b*. The flange-receiving slot 16 intersects the tensioner slot 12. In other arrangements, the flange-receiving slot 16 may not intersect the tensioner slot 12 and so form a blind groove.

The bracket 2 further comprises a mounting arm 18 which extends from the body portion 4. The mounting arm 18 extends from the side of the body portion 4 adjacent the leadscrew barrel 14 (between the leadscrew barrel 14 and the opening 6). A mounting hole 20 is formed through the mounting arm 18. A longitudinal axis of the mounting hole 20 is perpendicular to the first and second mounting holes 8, 10 and thus the longitudinal axis of the mounting hole 20 lies in the plane of the body portion 4.

The bracket 2 may be formed from metal, particularly aluminium, such as LM 25 or equivalent, or steel, such as ASTM A356 or equivalent. The bracket 2 may be manufactured using a Gravity Die Casting (GDC), low pressure or sand casting process, for example.

Figure 4:
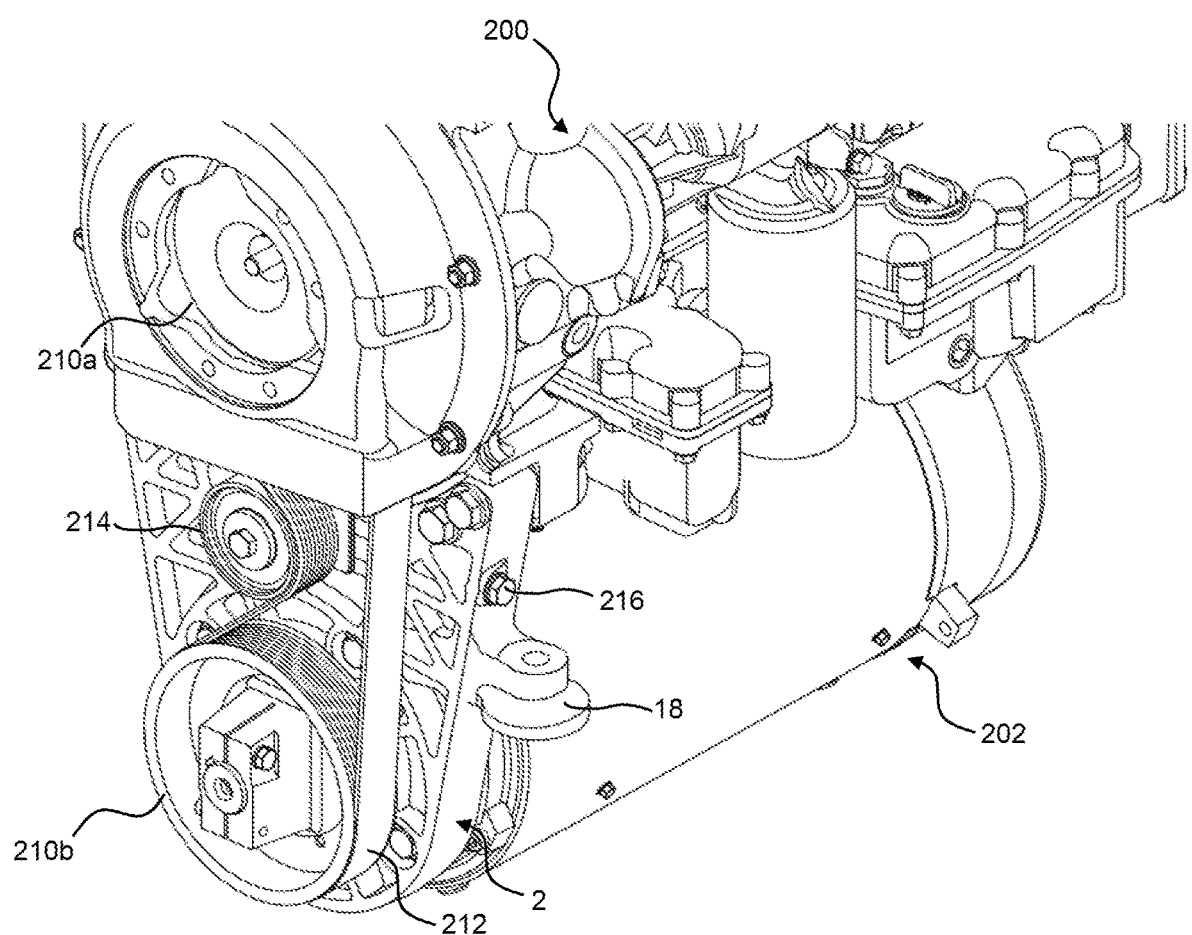
FIG. 4 is a perspective view of a power unit comprising the bracket.

FIG. 4 shows a power module, such as power module 112 of the TRU 110 described previously. The power module 112 comprises an internal combustion engine 200, such as a diesel engine, and an electric machine 202. The electric machine 202 may be an electric generator or a motor-generator unit which consists of an electric motor mechanically coupled to an electric generator. The engine 200 may drive a compressor of the refrigeration system and also the electric machine 202 (i.e. the electric generator) in order to generate electricity. Where, the electric machine 202 is a motor-generator unit, the electric motor may drive the compressor when the engine 200 is turned off and also drive the electric generator to generate electricity. The electric motor may be powered by a shore power source (e.g., Utility power, etc.) or by an on-board power source, such as a battery, solar panel, etc. The generated electricity may power a plurality of DC (Direct Current) components (not shown), such as DC fan motor(s) for a condenser fan or an evaporator blower (e.g., an Electrically Commutated Motor (ECM), a Brushless DC Motor (BLDC), etc.), a fuel pump, a drain tube heater, solenoid valves (e.g., controller pulsed control valves), etc.

Figure 5:
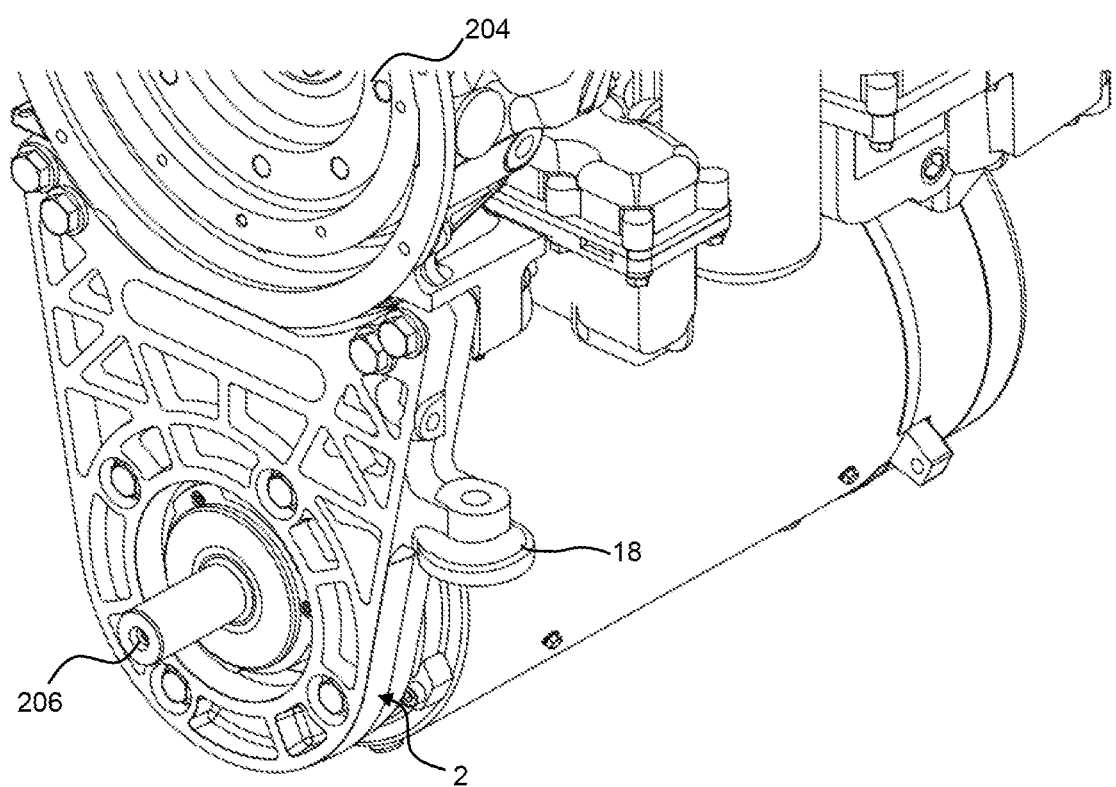
FIG. 5 is a perspective view of the power unit in a partially disassembled state.
Figure 6:
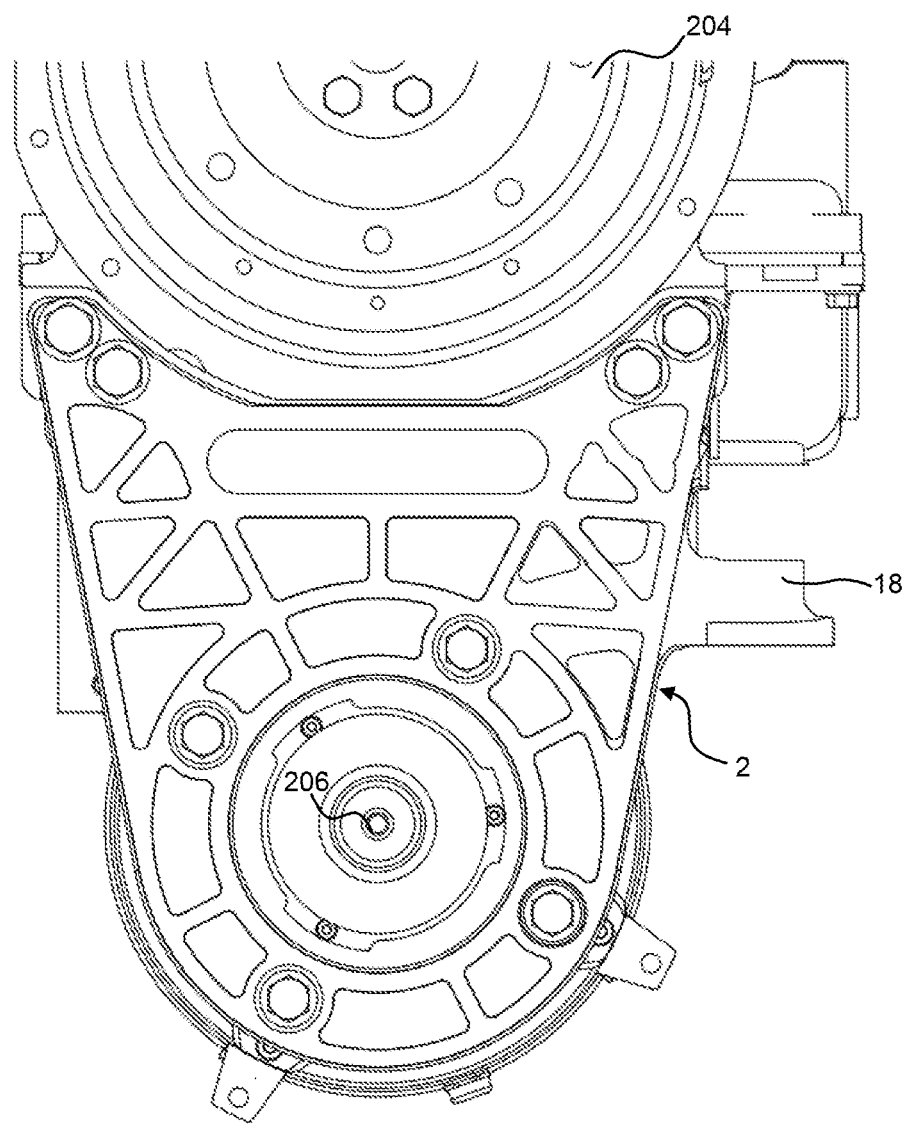
FIG. 6 is a side view of the power unit.

The electric machine 202 is connected to the engine 200 using the bracket 2. The bracket 2 is connected at one end to the engine 200. Specifically, as more clearly shown in FIGS. 5 and 6, the bracket 2 is abutted against a flywheel housing 204 of the engine, with a flange of the housing 204 received in the flange-receiving slot 16 formed in the top surface of the body portion 4 of the bracket 2. The top surface of the body portion 4 in the region of the shoulder portions 5*a*, 5*b* is curved to match the curvature of the flywheel housing 204. The bracket is affixed to the engine 200 by passing bolts (e.g. M12, Grade 8.8 or 10.9 bolts) through the second mounting holes 10 in the shoulder portions 5*a*, 5*b*.

The opening 6 receives a shaft 206 of the electric machine 202. The bracket is affixed to an end bell of the electric machine 202 by passing bolts (e.g. M12, Grade 8.8 or 10.9 bolts) through the first mounting holes 8 provided around the circumference of the opening 6. The body portion 4 of the bracket 2 may be provided with a circular ridge which extends around the opening 6 and engages with a complementary circular groove formed in the end bell of the electric machine 202 in order to ensure that the shaft 206 of the electric machine 202 is concentrically aligned within the opening 6.

The bracket 2 supports the electric machine 202 in a cantilevered fashion with the axis of the shaft 206 of the electric machine held parallel to the axis of the crank shaft of the engine 200. In order to provide the necessary stiffness and strength to hold the electric machine 202 (having a weight of over 100 kg) with little or no deflection, the bracket 2 may have a thickness of between 30-50 mm, or more preferably between 40-45 mm. In this example, the bracket has a uniform thickness of 43 mm which provides the required stiffness and strength for this application and loading.

The bracket 2, particularly the main body portion 4 of the bracket 2, is substantially symmetrical and so is able to distribute the load effectively.

Figure 7:
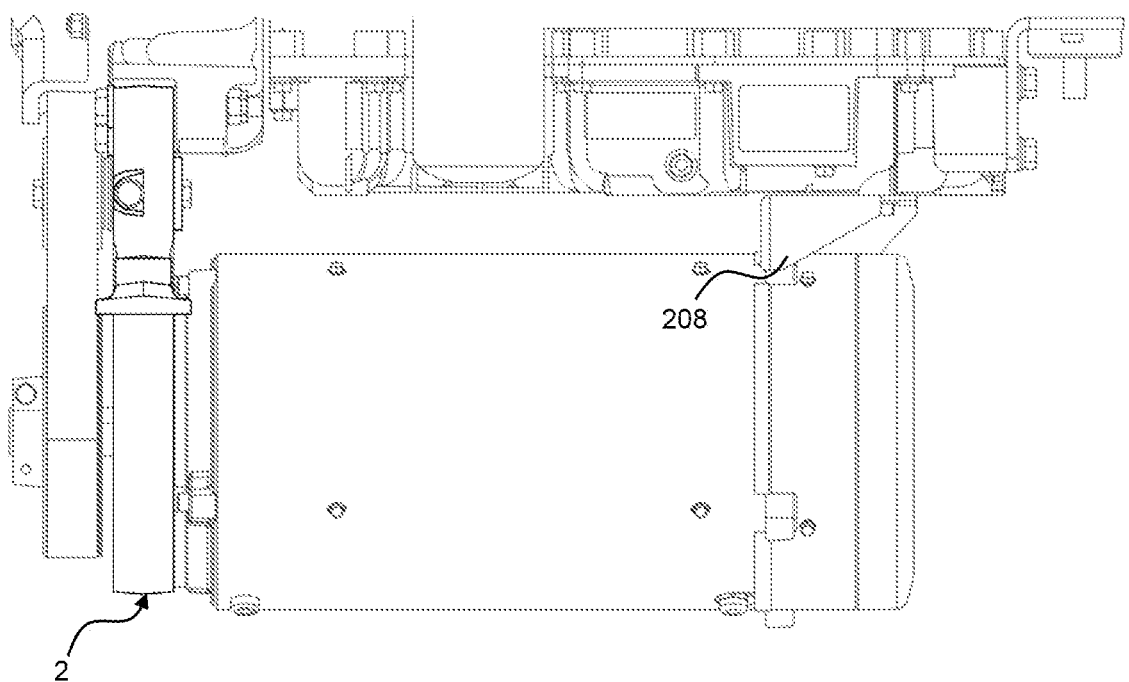
FIG. 7 is a front view of the power unit.

Although the weight of the electric machine 202 is primarily supported by the bracket 2, an additional safety support 208 may be provided on the electric machine 202 to connect under the sump of the engine 200, as best shown in FIG. 7.

As shown in FIG. 4, the shafts of the engine 200 and the electric machine 202 are provided with pulleys 210a, 210b which are coupled by a belt 212. A tensioner pulley 214 is provided between the pulleys 210a, 210b to tension the belt 212. The tensioner pulley 214 is translatably mounted to the bracket 2. In particular, the tensioner pulley 214 is mounted to a carriage located along the tensioner slot 12. The carriage comprises a nut that is threaded on to a leadscrew 216 which passes through the leadscrew barrel 14 (which itself is not threaded) and into tensioner slot 12. The leadscrew 216 may extend along the entire length of the tensioner slot 12 and be received by a bearing. The carriage is prevented from rotating, such that rotation of the leadscrew 216 causes the carriage and the tensioner pulley 214 to translate (slide) along the tensioner slot 12, thereby tensioning the belt 212. In other arrangements, the tensioner pulley 214 may be biased towards one side of the tensioner slot 12 such that it is able to automatically tension the belt 212 and hold the tensioner pulley 214 in position during use. Alternatively, the belt 212 may be automatically tensioned, but fixed in position manually.

Figure 8:
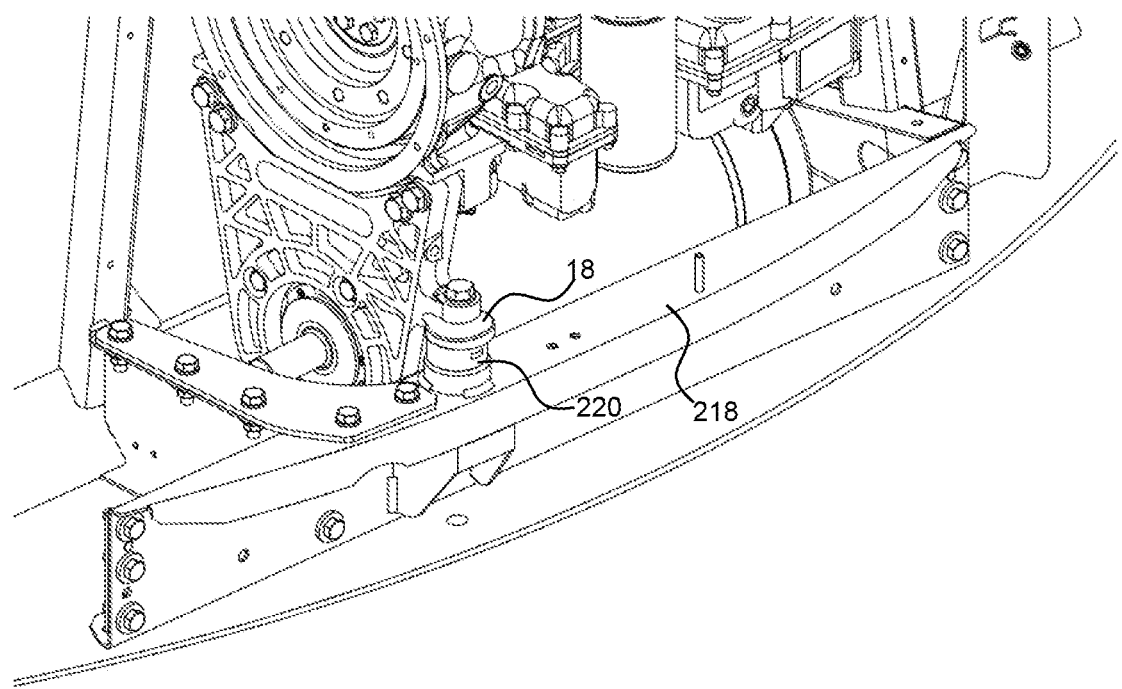
FIG. 8 is a perspective view showing the power unit attached to a support.

As shown in FIG. 8, the mounting arm 18 of the bracket 2 may be used to support the engine 200 on a frame 218 of the TRU 110. Specifically, the mounting hole 20 of the mounting arm 18 is received over an engine mount 220 provided on the frame 218. The engine 200 may be supported on the frame 218 at other locations.

As shown, the body portion 4 of the bracket 2 tapers towards its lower end and has a curved bottom surface. The bracket 2 thus mirrors the relative size and shapes of the engine 200 and the electric machine 202, thereby minimising its size. The bracket 2 also improves access to the engine 200 and electric machine 202 for assembly and maintenance.

Although the bracket 2 has been described with reference to a power module of a transport refrigeration unit, it will be appreciated that it may find other applications. In particular, the power module may form an Auxiliary Power Unit (APU). The APU can provide, for example, power to operate a secondary HVAC system to provide conditioned air to a cabin of the TU 125. The APU can also provide power to operate cabin accessories within the cabin such as a television, a microwave, a coffee maker, a refrigerator, etc. The APU can be operated when a main prime mover of the TU 125 (i.e. the prime mover which provides drive to move the TU 125) is turned off such as, for example, when a driver parks the TU 125 for an extended period of time to rest.

The invention claimed is:

1. A bracket for a power module of a transport refrigeration unit, the bracket comprising:
    a body portion including:
        an opening for receiving a shaft of an electric machine of the power module;
        a plurality of first mounting holes extending through the body portion and spaced around the opening for connecting the bracket to the electric machine; and
        a plurality of second mounting holes for connecting the bracket to an engine of the power module.

2. A bracket as claimed in claim 1, further comprising a mounting arm which extends from the body portion and configured to connect the power module to a support frame.

3. A bracket as claimed in claim 2, wherein the mounting arm comprises a mounting hole which is configured to be received over an engine mount provided on the frame.

4. A bracket as claimed in claim 1, wherein the body portion further comprises a tensioner slot for receiving a tensioner pulley, the tensioner pulley being mounted on a carriage which is translatably mounted along the tensioner slot so as to tension a belt provided between the engine and the electric machine.

5. A bracket as claimed in claim 4, wherein the body portion further comprises a leadscrew barrel which intersects the tensioner slot, wherein the leadscrew barrel receives a leadscrew which is configured to translate the carriage along the tensioner slot.

6. A bracket as claimed in claim 4, wherein the tensioner slot is provided at a position which is between the plurality of first mounting holes and the plurality of second mounting holes and extends laterally in a widthwise direction across the body portion.

7. A bracket as claimed in claim 1, wherein at least a portion of an end surface of the body portion is curved to correspond to a flywheel housing of the engine.

8. A bracket as claimed in claim 1, wherein the body portion comprises a pair of shoulders, the plurality of second mounting holes being provided on the shoulders.

9. A bracket as claimed in claim 1, wherein a slot is formed in an end surface of the body portion for receiving a flange of a flywheel housing of the engine.

10. A power module for a transport refrigeration unit comprising:
    a bracket including a body portion, the body portion including:
        an opening for receiving a shaft of an electric machine of the power module,
        a plurality of first mounting holes extending through the body portion and spaced around the opening for connecting the bracket to the electric machine, and
        a plurality of second mounting holes for connecting the bracket to an engine of the power module;
    an engine; and
    an electric machine connected to the engine via the bracket;

wherein the electric machine is connected to the bracket via the plurality of first mounting holes and the engine is connected to the bracket via the plurality of second mounting holes.

11. A power module as claimed in claim 10, wherein the electric machine is supported from the engine by the bracket in a cantilevered fashion.

12. A power module as claimed in claim 10, wherein the electric machine is supported from the engine by the bracket so that a shaft of the engine and a shaft of the electric machine are held parallel to one another.

13. A power module as claimed in claim 10, wherein a shaft of the engine and a shaft of the electric machine are connected by a belt.

14. A power module as claimed in claim 10, wherein the electric machine is connected to the bracket via an end bell of the electric machine and/or the engine is connected to the bracket via a flywheel housing of the engine.

15. A power module as claimed in claim 10, wherein a slot is formed in an end surface of the body portion for receiving a flange of a flywheel housing of the engine.

16. A transport refrigeration unit comprising a power module, the power module including a bracket, the bracket including a body portion, the body portion including:
 an opening for receiving a shaft of an electric machine of the power module,
 a plurality of first mounting holes extending through the body portion and spaced around the opening for connecting the bracket to the electric machine, and
 a plurality of second mounting holes for connecting the bracket to an engine of the power module;
the power module further including:
 an engine; and
 an electric machine connected to the engine via the bracket;
 wherein the electric machine is connected to the bracket via the plurality of first mounting holes and the engine is connected to the bracket via the plurality of second mounting holes.

* * * * *